(12) United States Patent
Hoitz

(10) Patent No.: US 6,278,126 B2
(45) Date of Patent: *Aug. 21, 2001

(54) TRANSPORT DEVICE FOR X-RAY CASSETTES, EACH HAVING A PHOSPHOR SHEET STIMULABLE BY X-RAYS, IN A CASSETTE PROCESSING APPARATUS

(75) Inventor: Gerd Hoitz, Bad Ditzenbach (DE)

(73) Assignee: Eastman Kodak Company, Rochester, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/166,340

(22) Filed: Oct. 5, 1998

(30) Foreign Application Priority Data

Oct. 11, 1997 (DE) .............................. 197 45 012

(51) Int. Cl.[7] .................................................. G03B 42/02
(52) U.S. Cl. ................................................. 250/589
(58) Field of Search ............................................ 250/589

(56) References Cited

U.S. PATENT DOCUMENTS

| | | |
|---|---|---|
| 4,743,758 | 5/1988 | Chan et al. . |
| 5,105,079 | 4/1992 | Boutet et al. . |
| 5,107,116 | 4/1992 | Boutet . |
| 5,151,592 | 9/1992 | Boutet et al. . |
| 5,326,983 | * 7/1994 | Hejazi ................................. 250/589 |
| 5,330,309 | 7/1994 | Brahm et al. . |
| 5,493,128 | 2/1996 | Boutet . |

FOREIGN PATENT DOCUMENTS

| | | |
|---|---|---|
| 37 18131 C2 | 12/1990 | (DE) . |
| 44 17050 A1 | 11/1995 | (DE) . |
| 0 309 874 | 4/1989 | (EP) . |
| 0 747 752 A1 | 12/1996 | (EP) . |

* cited by examiner

Primary Examiner—Constantine Hannaher
(74) Attorney, Agent, or Firm—William F. Noval

(57) ABSTRACT

A transport device for X-ray cassettes, each having a phosphor sheet stimulable by X-rays, is provided in a cassette processing apparatus (100), which is of simple physical construction and allows rapid and reliable processing of X-ray cassettes of different formats in a space-saving and user-friendly fashion. The apparatus has a plurality of transporters (11, 12, 21, 22) which are arranged in a horizontal plane (E) and are spaced apart from one another in the transport direction (T) and also perpendicular thereto. A conveying mechanism (30) which, in the area of the spacings (A1, A2, A3) between the transport means, can be conveyed vertically in and out as far as the plane (E) in such a way that lowering effects a transfer of an X-ray cassette into a cassette receiving device (50), and raising effects a transfer out of the receiving device (50). The receiving device (50) can be pivoted from the vertical into a horizontal transport direction, for direct loading of an X-ray cassette into the loading slot of a reading unit suitable for the phosphor sheet.

8 Claims, 7 Drawing Sheets

TRANSPORT DEVICE FOR X-RAY CASSETTES, EACH HAVING A PHOSPHOR SHEET STIMULABLE BY X-RAYS, IN A CASSETTE PROCESSING APPARATUS

FIELD OF THE INVENTION

The invention relates to a transport device for X-ray cassettes, each having a phosphor sheet stimulable by X-rays, in a cassette processing apparatus, comprising a first and a second conveying means configured as a cassette loading and unloading device, by which a plurality of vertically positioned X-ray cassettes of different formats can be guided to and away from a reading and erasing unit suitable for the phosphor sheet and provided with a horizontal loading slot.

BACKGROUND OF THE INVENTION

German Patent DE 37 18 131 C2 discloses a device for the transport of film sheets, the device having a transport table over which film sheets output from a cassette loading and unloading apparatus are transported to a developing apparatus. The transport table is selectably adaptable to different loading and unloading slots of the attached apparatuses. This device is suitable, however, only for straight-line transport from the cassette loading and unloading apparatus to the developing apparatus, for which purpose the apparatuses are to be arranged in a line one behind another. It is disadvantageous that this arrangement requires a long positioning depth or length for the entire assemblage of apparatuses. In addition, the loading and unloading points of the apparatuses are arranged on sides which face away and are remote from one another.

A modification of a transport device which is improved over the aforesaid device is disclosed by German Patent DE 44 17 050 A1, in which the films are transportable, by means of a transport carriage provided with several conveyor belts, to the loading and unloading slots which are arranged at different heights from one another.

European Patent Application EP 0 309 874 B1 discloses a handling apparatus for X-ray film cassettes with a phosphor-coated foil as a recording material. The cassettes to be processed do not need to be individually loaded into the handling apparatus, but can be loaded automatically from a cassette stack into the apparatus. For this purpose, appropriately configured cassette stack holders for the cassettes being loaded or unloaded are used, which are each arranged in front of a vertically extending cassette loading and unloading slot of the processing apparatus. In this context, transport of the cassettes from the loading slot—via apparatuses, for example, for detecting the cassette format, reading out patient data, laser-scanning the latent image on the phosphor-coated foil, etc.—to the unloading slot takes place in essentially straight-line fashion through the apparatus. This transport system also requires that the handling apparatus be long, and therefore occupies a large volume.

A reading unit for X-ray cassettes having a phosphor-coated foil as recording material (Scanner for PSL Radiography) is described by European Patent Application EP 0 747 752 A1. In this, a cassette is transported from a cassette stack, by means of correspondingly configured elements, via an elongated transport belt to a scanner.

U.S. Pat. No. 5,493,128 discloses a receiving device for X-ray cassettes in a handling apparatus (autoloader) suitable for the transport of vertically positioned cassettes of different formats with no need for additional pallets. This device substantially has a part, configured as a separating mechanism, with a number of slots into which the cassettes are loaded. By means of a part which can be lifted and lowered vertically and moved horizontally forward in steps, and which has a number of slots that corresponds to the number of slots in the separating mechanism, the cassettes are transported to a transfer device which transfers them into the reading and erasing unit.

This transport device is, however, of complex physical construction and, because of the large number of moving parts whose movements must be precisely adjusted to one another, is also susceptible to malfunctions.

SUMMARY OF THE INVENTION

It is the object of the invention to create a transport device in a processing apparatus for X-ray cassettes which is of simple physical construction and allows rapid and reliable processing of X-ray cassettes of different formats in a space-saving and user-friendly fashion.

The transport device according to the invention comprises a plurality of transport means which are arranged in a horizontal plane and are spaced apart from one another in the transport direction and also perpendicular thereto, as well as conveying means which, in the area of the spacings between the transport means, can be conveyed vertically in and out as far as the plane in such a way that lowering effects a transfer of an X-ray cassette into a cassette receiving device, and raising effects a transfer out of the device. Means are also provided for pivoting the receiving device from the vertical into a horizontal transport direction, for direct loading of an X-ray cassette into the loading slot of a reading unit.

The particular advantageous result of an arrangement of this kind is that X-ray cassettes of different formats can be transferred in a space-saving manner from a vertical transport position into a horizontal one. Furthermore, no additional means, such as adapters or the like, are needed for the transport device in order to be able to receive and deposit cassettes of different formats.

The invention, and its objects and advantages, will become more apparent in the detailed description of the preferred embodiments presented below.

DETAILED DESCRIPTION OF THE INVENTION

Figure 1:
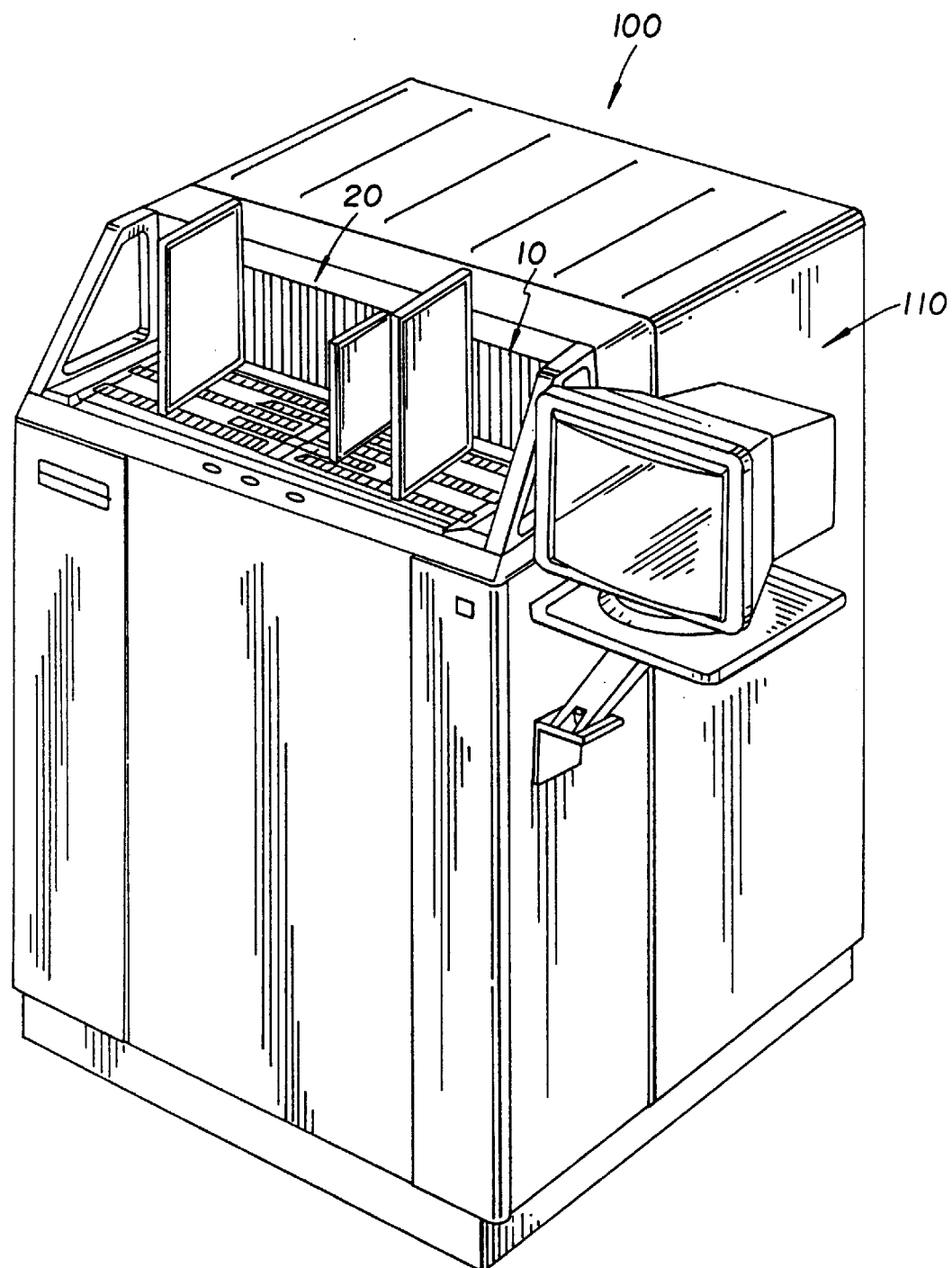
FIG. 1 is a schematic drawing showing a known processing apparatus for X-ray cassettes, with conveying means configured as a cassette loading and unloading device.

The transport device according to the invention is utilized in a processing apparatus 100 for X-ray cassettes, an autoloader known per se and depicted in FIG. 1. The autoloader substantially comprises two conveying means 10 and 20 configured as cassette loading and unloading devices, an electronic control unit (not depicted), a reading unit (scanner) and erasing unit for the phosphor sheet (not depicted) in housing part 110, and further transport means for transporting and handling the X-ray cassettes between the aforesaid units. The reading unit and the scanner contained therein have already been described in detail in one of U.S. Pat. Nos. 4,743,758; 5,105,079; 5,107,116; and 5,151,592, so that additional explanation may be dispensed with. The transport means for transporting the X-ray cassettes between the reading and erasing units are also sufficiently disclosed in U.S. Pat. No. 5,330,309 and, in particular with reference to FIG. 3, in U.S. Pat. No. 5,493,128, so that they do not require further explanation. X-ray cassettes 1 of different formats, but preferably of the formats 18×24 cm, 24×30 cm, 35×43 cm, and 35×35 cm, with the same X-ray cassette thickness in each case, are in particular transportable by means of the transport device.

Figure 2:
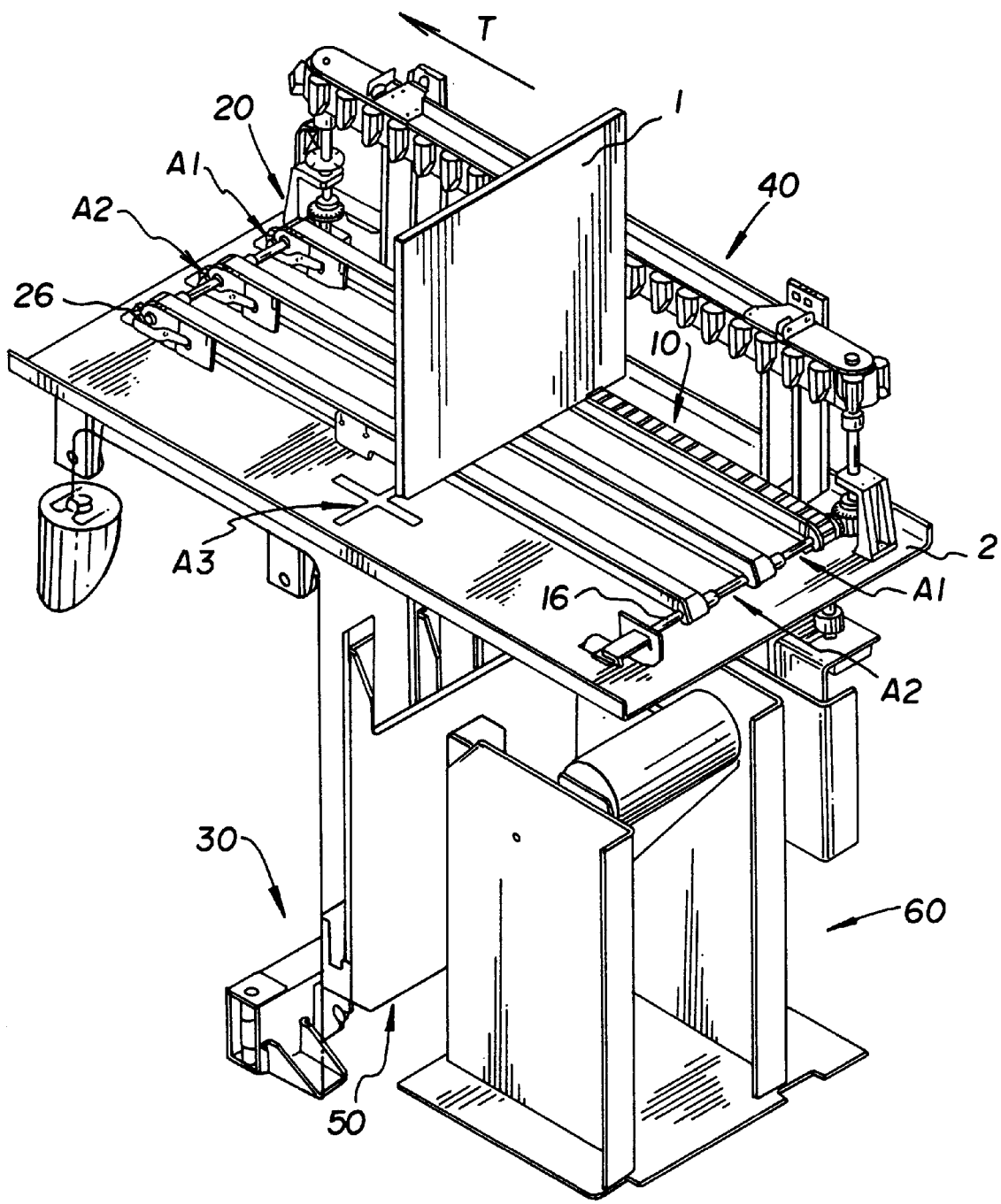
FIG. 2 is a perspective view of the transport device for X-ray cassettes according to the invention.
Figure 3:
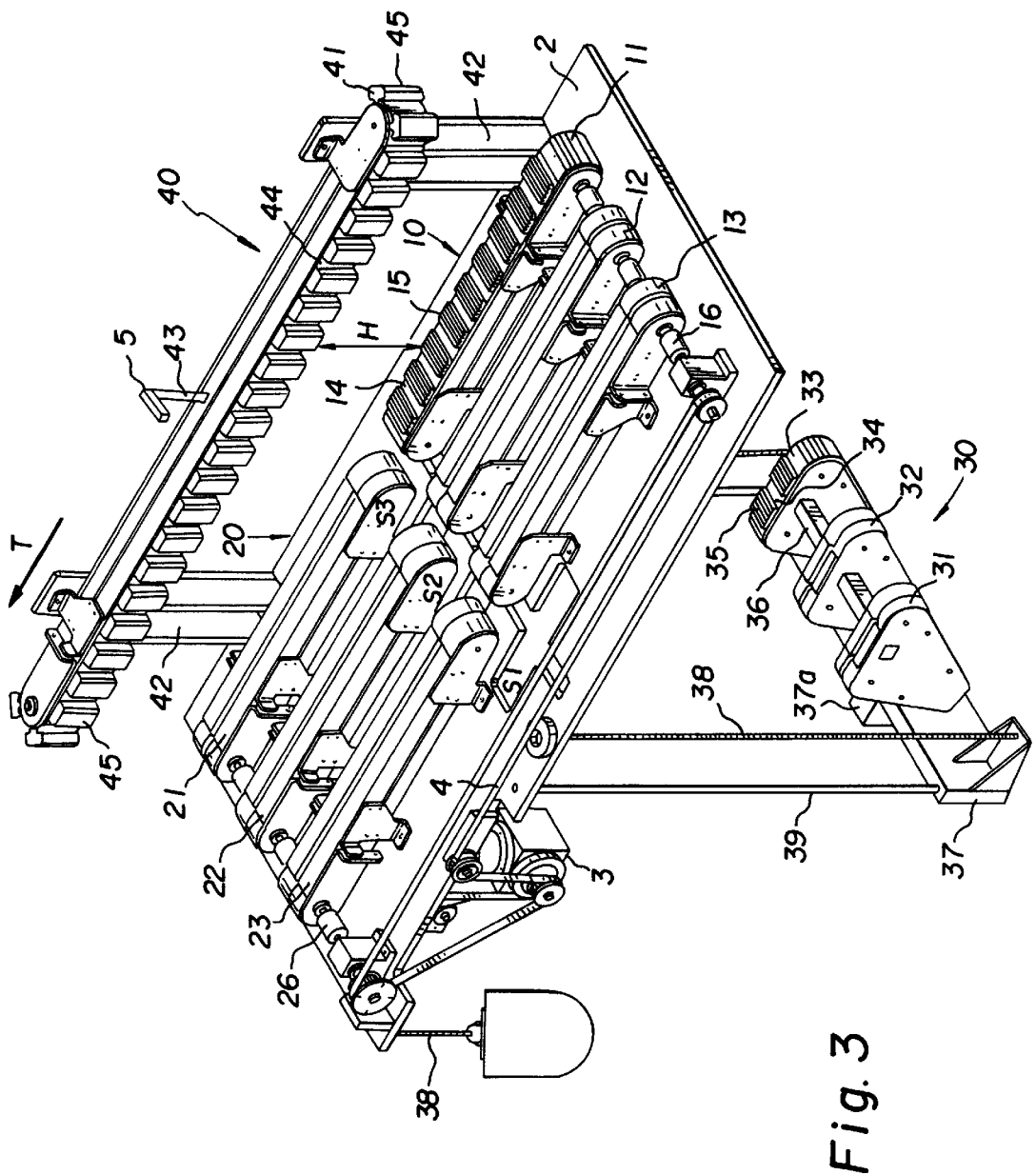
FIG. 3 is a perspective detailed view of the various transport and conveying means, without the pivoting device.

As depicted in FIGS. 2 and 3, conveying means 10 and 20 arranged on a carrier plate 2 have at least three endless transport belts 11 to 13 and 21 to 23, which lie horizontally in a plane E and are separated by a spacing A3 in the transport direction T of the X-ray cassettes, and also by spacings A1 and A2 perpendicular thereto. Spacing A3 is selected such that it slightly exceeds the thickness of an X-ray cassette. A further cassette holding element 40, configured as an endless transport belt 41, runs parallel to the rear longitudinal edge of transport belts 11 and 21 in a vertical plane. Transport belt 41 is arranged, by means of support elements 42, at a height H from horizontally extending transport belts 11 and 21 such that an X-ray cassette of even the smallest format can still be reliably seized and transported by transport belt 41. For vertically arresting and transporting the X-ray cassettes on cassette loading device 10, only the respective transport belts 11 and 41 have knob-shaped elements 15 and 45 which are spaced apart from one another and arranged on the transport belts. The X-ray cassettes can be deposited in a vertical position into receptacles 14 and 44 formed thereby. The drive shafts 16 and 26 of the transport belts of conveying means 10 and 20 are driven by means of a stepping motor 3 via a toothed belt 4, as are also the front and rear drive shafts 46 and 47 of transport belt 41 via bevel gears 17 and 18, as visible in FIG. 5. In a further embodiment of the invention, the aforesaid transport belts can also be driven by respective separate stepping motors which are then operated by the electronic control unit. In both embodiments, however, all transport belts 11 to 13, 21 to 23, and 41 are each driven synchronously, so that no slippage occurs between the individual transport belts.

Figure 4:
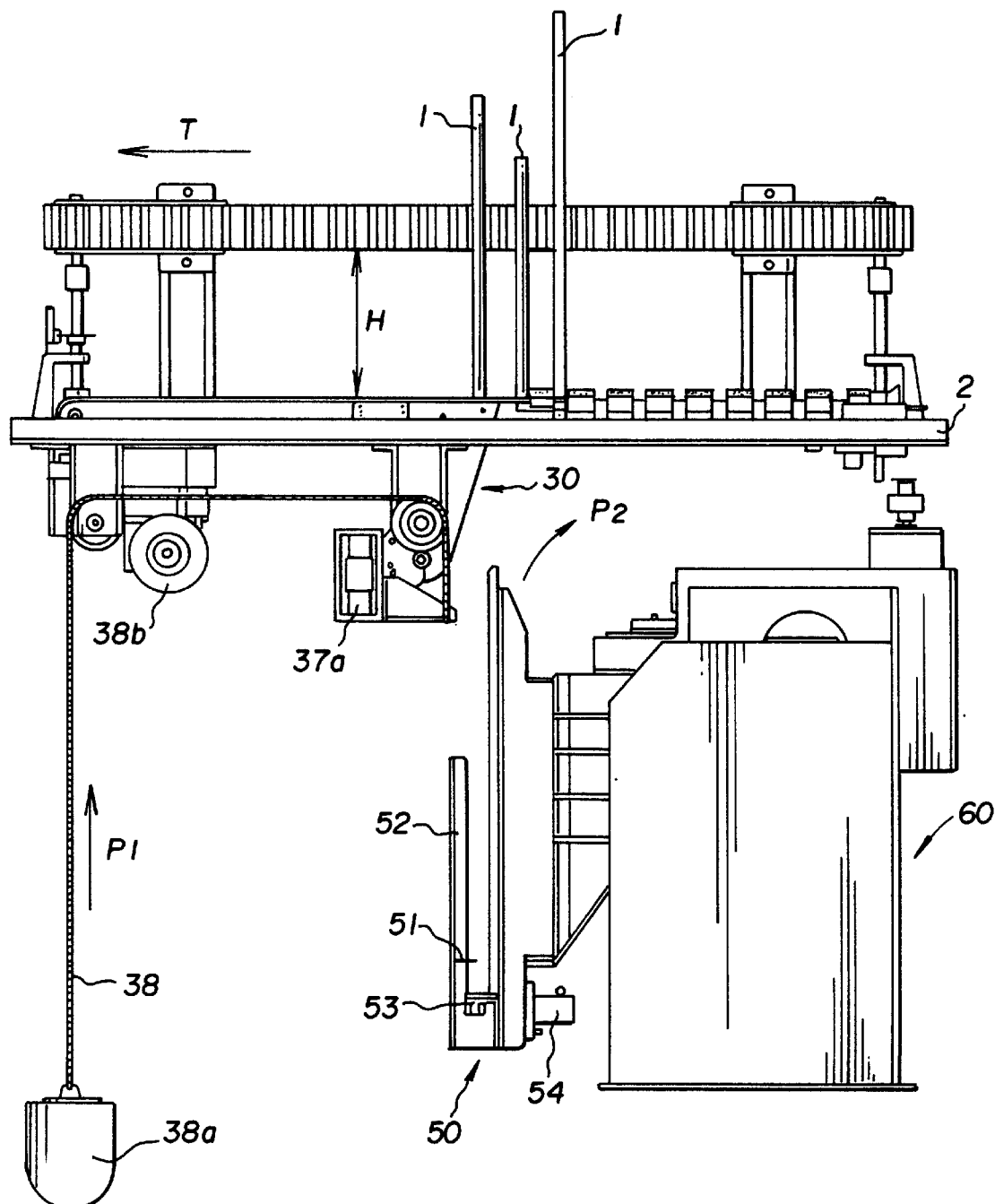
FIG. 4 is a side view of the entire transport device in the state prior to transfer of an X-ray cassette into the holding means of the pivoting device.
Figure 5:
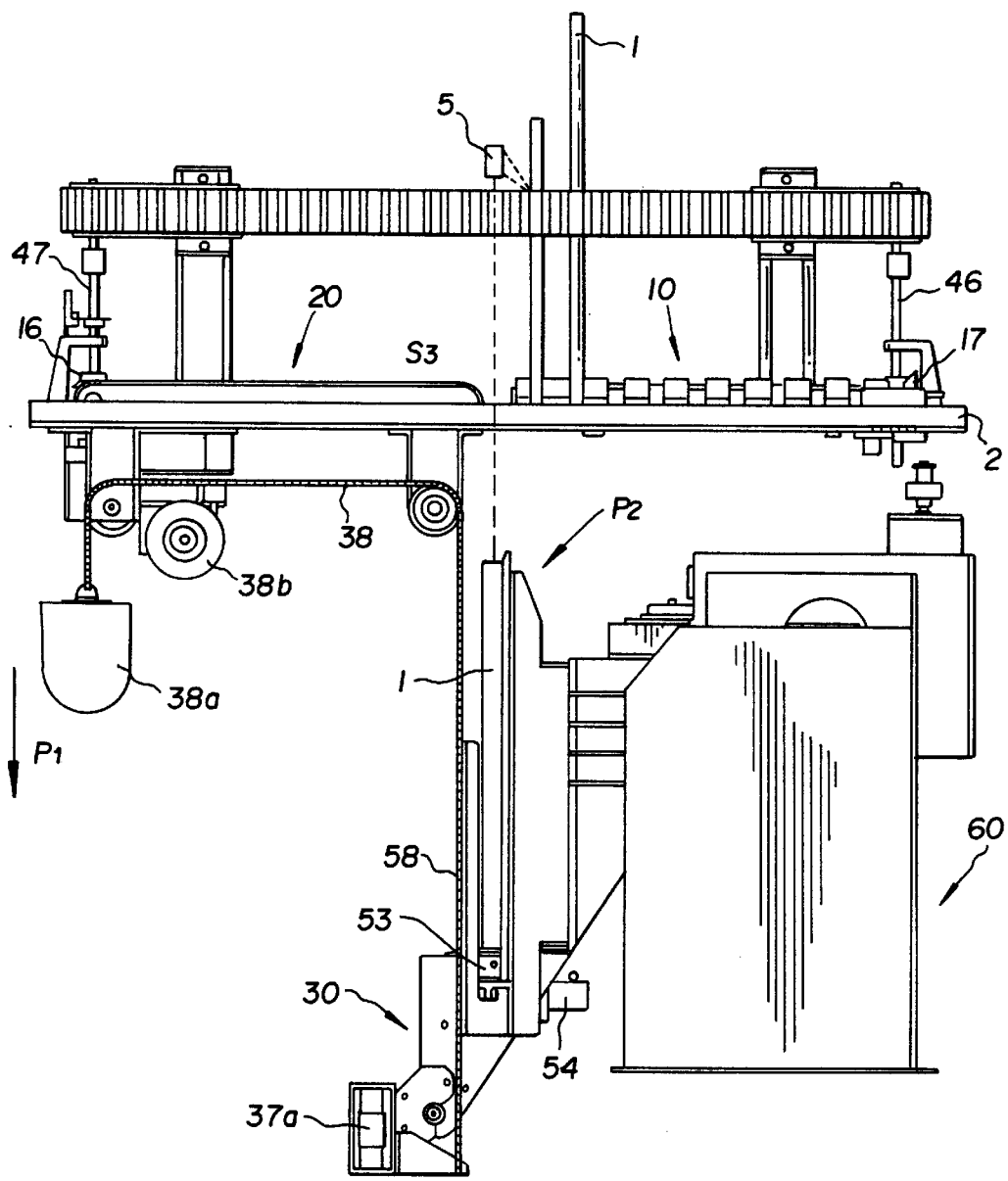
FIG. 5 is a side view of the transport device as shown in FIG. 4, in the state after transfer of an X-ray cassette into the holding means of the pivoting device.

A conveying mechanism 30 which comprises three conveyor belts 31 to 33 spaced apart perpendicular to the transport direction T and arranged on a carrier 37, is movable vertically, as depicted by arrow P1 in FIGS. 4 and 5, by means of a chain 38 driven by a motor 38b. Carrier plate 2 has, at spacings A1 to A3, respective openings S1 to S3 through which conveyor belts 31, 32, and 33 of conveying mechanism 30 can be introduced as far as plane E. The contact length of conveyor belts 31 to 33 is selected such that spacing A3 is definitely overlapped. Transfer of an X-ray cassette from conveying means 10 to conveying mechanism 30, and from conveying mechanism 30 to conveying means 20 configured as the cassette unloading device, can thus be accomplished without difficulty. A counterweight 38a is provided in order to minimize the energy expenditure for moving the entire conveying mechanism 30 up and down, with carrier 37 of conveying mechanism 30 being guided by means of two guide rods 39. Synchronous driving of conveyor belts 31 to 33 is guaranteed by means of a stepping motor 37a which drives a drive shaft 36. As already mentioned, all the aforesaid transport and conveyor belts 11 to 13, 21 to 23, and 31 to 33 are driven in synchrony by means of an electronic control unit (not depicted), known per se, of motors 3 and 37a.

Figure 6:
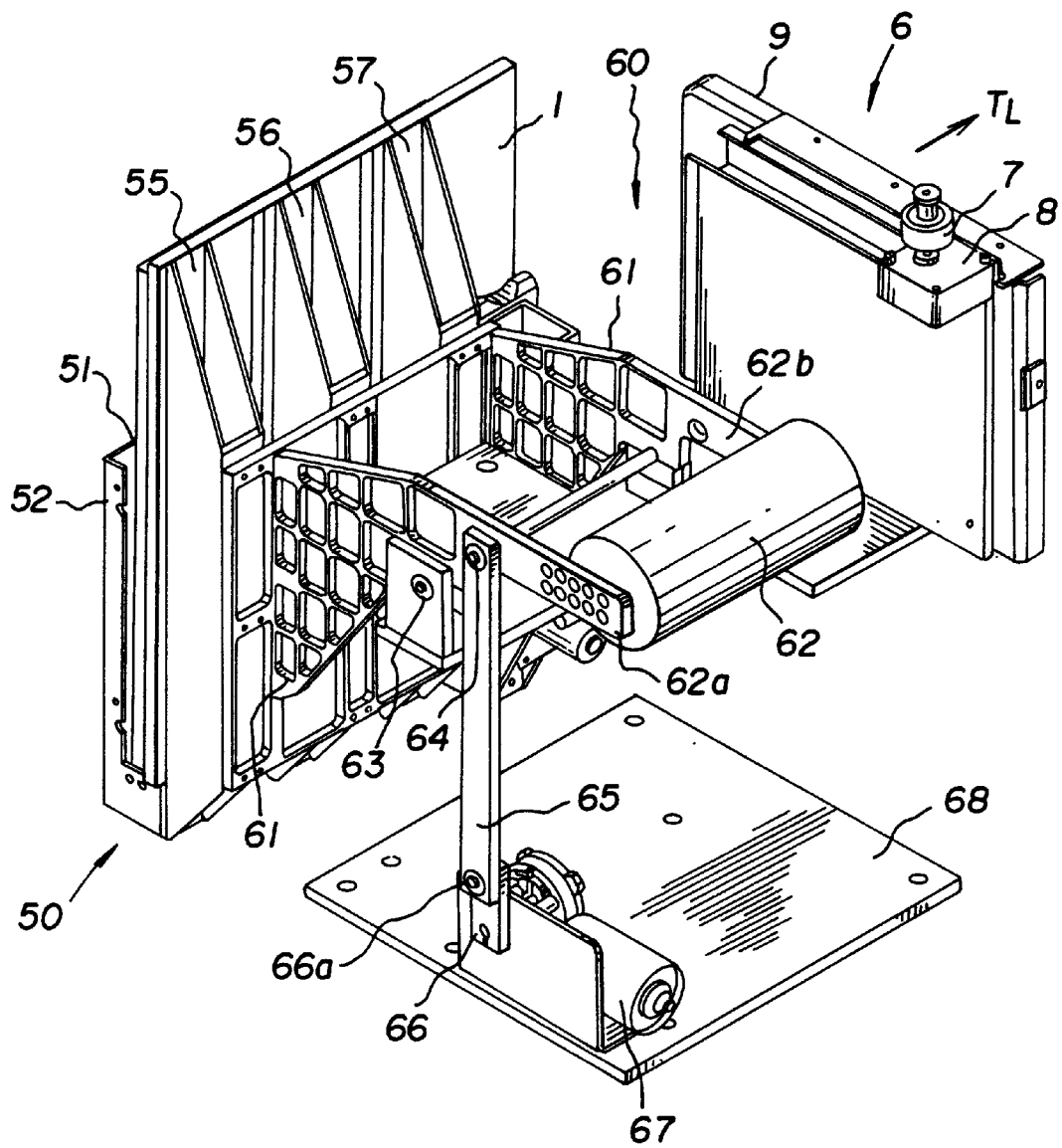
FIG. 6 is a perspective view of the pivoting device with the cassette receiving device in the vertical state according to FIG. 5.

As is apparent from FIGS. 4 to 6, a cassette receiving device 50 is coupled via joining elements 61 to a pivoting table 60, the cassette receiving device 50 substantially comprising three U-shaped carrier elements 55, 56, and 57 which are spaced apart from one another. Loading slot 51 resulting from the U-shaped configuration serves to receive an X-ray cassette 1 which is prevented from falling out to the side by delimiting panels 52. The spacings between carrier elements 55 to 57 are adapted to the width and spacings of the respective conveyor belts 31 to 33, so that conveying mechanism 30 can easily be transferred out of plane E (FIG. 4) into the state as depicted in FIG. 5. Arranged in the bottom of loading slot 51 are a transport roller 53 that can be driven by a motor 5453, and a switching roller 58, on which X-ray cassette 1 is supported. The switching roller serves as a signal generator for the control unit, indicating whether an X-ray cassette has been loaded into the loading slot. To ensure that an X-ray cassette is reliably transferred into loading slot 51 (FIGS. 4 and 5) when conveying mechanism 30 is lowered vertically, the spacing from the top edge of carrier elements 55 to 57 to the bottom edge of carrier plate 2 (FIG. 4) is selected such that X-ray cassette 1 is either still supported on carrier plate 2 or already supported on carrier elements 55 to 57, without having the pivoting movement of the pivoting table, depicted by arrow P2 in FIG. 5, impeded by carrier plate 2.

An optoelectronic sensor 5 mounted on cassette holding element 40 above opening S3 (A3) by means of a holding member 43 determines on the one hand whether an X-ray cassette is located in a position for transfer from conveying means 10 into conveying mechanism 30, and whether it has been properly conveyed into loading slot 51. Optical scanning is accomplished in the manner depicted with dashed lines in FIG. 5. Sensor 5 is formed by IR transmission and reception elements known per se, which are controlled by means of the electronic control unit (not depicted).

Figure 7:
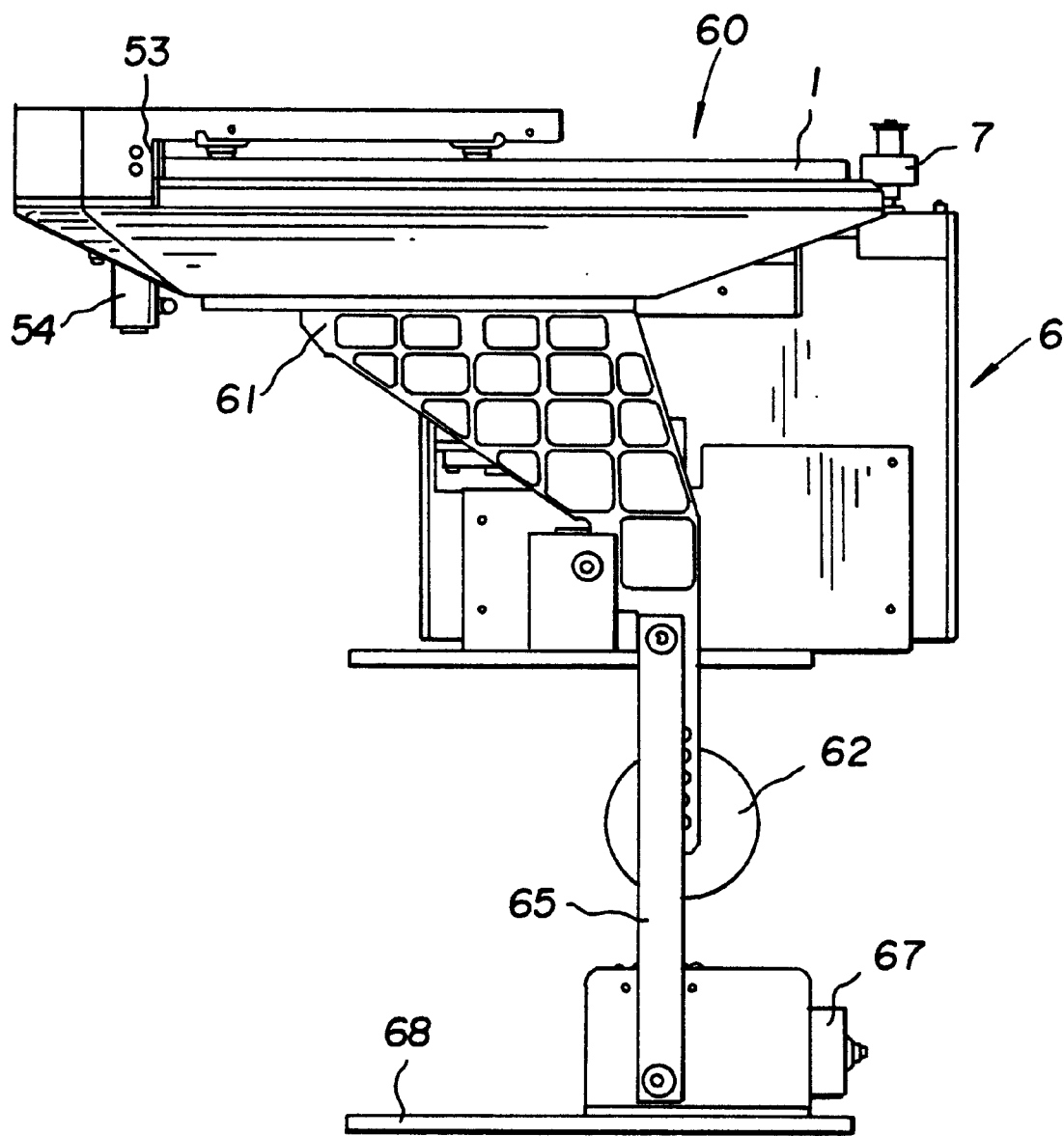
FIG. 7 is the pivoting device with the cassette receiving device in the horizontal state for transfer into a reading unit (not depicted).

As already mentioned, the cassette receiving device 50 is coupled via joining elements 61 to pivoting table 60. To compensate for the weight of cassette receiving device 50, a counterweight 62 is attached to the extension of joining elements 61 constituted by carrier arms 62a and 62b, as is evident from FIG. 6. Pivoting table 60 is pivoted from the vertical into the horizontal position (arrow PF2) by means of fulcrum 63, which is also supported on the housing of processing apparatus 100 (not depicted). A crank rod 65 which is joined via the center of rotation 66a to a further crank rod 66 coupled to a drive motor 67, engages on a shaft 64 which is arranged alongside the fulcrum at a spacing of 1:2 of the crank length and offset upward at a 45-degree angle. The result of this configuration is that with a 180-degree motor rotation or crank rotation of crank rod 66, for example from the position corresponding to FIGS. 6 to 7, cassette receiving device 50 can be pivoted 90 degrees with minimal energy expenditure.

Also mounted on the housing of processing apparatus 100 is a conveying means 6 with which an X-ray cassette 1 located in loading slot 51 can be transported in the direction TL to the reading unit. The X-ray cassette is seized by means of a transport roller 7 which is driven by a stepping motor 8 and is displaceable along a guide rail 9 by means of a motor-driven belt drive (not depicted), and conveyed by the two driven transport rollers 53 and 7 in the direction TL toward the reading unit, until it is seized by further transport rollers of the reading unit.

With cassette processing apparatus 100 in its initial state, conveying mechanism 30 which is not loaded with an X-ray cassette, is located in plane E, as depicted in FIG. 4. X-ray cassettes 1 with the aforesaid different formats can now be loaded into conveying means 10, configured as the cassette loading device, in any order and in vertical alignment into receptacles 14 and 44 of transport belts 11 and 41. Up to fifteen X-ray cassettes can be delivered to the cassette loading device in accordance with the preferred length of the transport belts. After actuation of the start button on the electronic control unit (not depicted), optoelectronic sensor 5 determines whether an X-ray cassette 1 is in a position for transfer to conveying mechanism 30. If not, stepping motors 3 and 37a advance transport belts 11 to 13, 21 to 23, 31 to 33, and 41 into that position. If so, a further advancing movement aligns X-ray cassette 1 in the center of conveying mechanism 30 and thus also exactly in A3. The stepping motors for the transport belts thereafter remain shut down. Conveying mechanism 30 is lowered by means of stepping motor 37a out of plane E, such that the X-ray cassette is introduced into loading slot 51 of cassette receiving device 50. Switching roller 58 in the bottom of loading slot 51 is actuated by the weight of the X-ray cassette, and the switching signal generated thereby causes the electronic control unit to actuate motor 67. Pivoting table 60 is thus transferred by crank rods 66 and 67 from a vertical into a horizontal position, actuating a contact switch (not depicted). The triggering of the contact switch causes transport roller 7 to move along guide rail 9 until it comes into non-positive contact with the lateral edge of the X-ray cassette, adjusted by a friction clutch. Transport to the reading unit for the phosphor-coated recording sheet is then accomplished by means of transport rollers 53 and 7. After the sheet has been read (scanned) and the latent image has then been erased, as recited initially by the U.S. patent documents, the procedure described occurs in reverse order: the X-ray cassette is reintroduced into loading slot 51 by means of transport rollers 53 and 7; pivoting table 60 is pivoted out of the horizontal into the vertical position; the X-ray cassette is transferred by means of conveying mechanism 30 out of loading slot 51 into plane E; and stepping motors 3 and 37a are activated so that the processed X-ray cassette 1 is transported onto transport belts 21 to 23 of the cassette unloading device. All the X-ray cassettes deposited in cassette loading device 10 are processed in the manner indicated above, the number of cassette deposition spaces in the cassette loading and unloading device being identical. X-ray cassettes not removed from the cassette unloading device are safely received by a tray (not depicted) arranged at the end of transport belts 21 to 23.

The invention has been described in detail with particular reference to preferred embodiments thereof, but it will be understood that variations and modifications can be effected within the spirit and scope of the invention.

What is claimed is:

1. A transport device for X-ray cassettes, each having a phosphor sheet stimulable by X-rays, in a cassette processing apparatus, said transport device comprising:

a first and a second conveyors, with which a plurality of vertically positioned X-ray cassettes of different formats can be guided to and away from a reading and erasing unit suitable for the phosphor sheet and provided with a horizontal loading slot between said first and second conveyors;

each of said first and second conveyors including a plurality of transportors, which are arranged in a horizontal plane and are spaced apart from one another in a transport direction;

a cassette holding element which is arranged in a plane vertical to the transporters and forms a Tear delimitation of the conveyors;

a conveying mechanism which, in the area of the spacings between the transporters, can be conveyed vertically in and out as far as a plane in such a way that lowering effects a transfer of an X-ray cassette into a cassette receiving device, and raising effects a transfer out of the receiving device; and a device adapted to pivot the cassette receiving device from the vertical into a horizontal transport direction, for direct loading of an X-ray cassette into the loading slot of the reading unit.

2. A transport device as defined in claim 1, wherein the transportors of the conveyors are aligned centeredly with respect to one another.

3. A transport device as defined in claim 1, wherein the transportors are formed by endless transport belts provided with receptacles for centered deposition of an X-ray cassette.

4. A transport device as defined in claim 3, wherein only the transport belt of the transport belt of the first conveyor has receptacles.

5. A transport device as defined in claim 4, wherein the receptacles are formed by knobs spaced apart from one another.

6. A transport device as defined in claim 1, wherein the cassette holding element comprises an endless transport belt provided with receptacles.

7. A transport device as defined in claim 6, wherein only the transport belt with receptacles is provided for centered receiving of an X-ray cassette.

8. A transport device as defined in claim 1, wherein the conveying mechanism comprises three endless conveyor belts arranged spaced apart on a carrier.

* * * * *